United States Patent [19]

Brothers

[11] Patent Number: 4,616,581
[45] Date of Patent: Oct. 14, 1986

[54] PLANTING APPARATUS

[76] Inventor: Glen E. Brothers, Rte. 1, Box 80 C, Dix, Nebr. 69133

[21] Appl. No.: 728,183

[22] Filed: Apr. 29, 1985

Related U.S. Application Data

[63] Continuation of Ser. No. 239,059, Feb. 27, 1981, abandoned.

[51] Int. Cl.$^4$ ............................................... A01C 5/00
[52] U.S. Cl. ........................................ 111/85; 172/197
[58] Field of Search ..................... 111/14, 18, 52, 85, 111/66, 84, 86, 80, 77, 56; 172/126, 175, 195, 197, 612, 200, 686, 701, 730, 738

[56] References Cited

U.S. PATENT DOCUMENTS

| | | | |
|---|---|---|---|
| 1,204,890 | 11/1916 | Logsdon | 37/98 |
| 1,326,538 | 12/1919 | Smith | 172/655 |
| 2,214,812 | 9/1940 | Drew | 172/200 |
| 2,659,289 | 11/1953 | Holman | 111/66 |
| 2,755,751 | 7/1956 | Beilke | 111/84 |
| 3,308,775 | 3/1967 | Klene | 111/86 |
| 3,625,166 | 12/1971 | Woodley | 111/7 |

FOREIGN PATENT DOCUMENTS 236419 7/1911 Fed. Rep. of Germany ........ 111/86

*Primary Examiner*—James R. Feyrer
*Attorney, Agent, or Firm*—Robert S. Smith

[57] ABSTRACT

Apparatus for seeding includes a first plurality of shovels disposed in a rank at uniform intervals and a second plurality of shovels disposed in a second rank at uniform intervals. The first and second ranks are disposed in generally parallel relationship with the track of the shovels in the second rank disposed intermediate the tracks of the shovels in the first rank. A plurality of press wheels are mounted for rotation. Each of the press wheels is disposed in aligned relationship with the track of one of the shovels. A chain is fixed to each of the plurality of first shovels in the first rank. A cylinder is fixed to each of the chains at the end thereof remote from the first rank. Each cylinder extends close to the press wheel which is aligned with the shovel disposed in the first rank on which the associated chain is mounted.

11 Claims, 2 Drawing Figures

PLANTING APPARATUS

This is a continuation of application Ser. No. 239,059, filed Feb. 27, 1981, now abandoned.

BACKGROUND OF THE INVENTION

The invention relates to agricultural machines and particularly to apparatus for planting seeds. It will be understood that, while the invention has particular application to apparatus intended to be used in planting grain on large tracts of land, that it also has application to apparatus for planting other types of seed even on relatively small parcels of land.

Apparatus commonly used for planting such large tracts of land typically includes a first plurality of plows or shovels disposed at equal intervals along a first line or rank and a second plurality of plows or shovels disposed at the same equal intervals along a second line or rank which is parallel to the first line. The apparatus is moved by a tractor or other apparatus in a direction which is perpendicular to the first and second rank to produce seed trenches or rows which are generally parallel and spaced a uniform distance apart. That distance is, more specifically, one half the distance between adjacent plows or shovels in either the first or second line. This follows since the plows or shovels in the first line are offset axially from the plows or shovels in the other line, a distance which is one half the distance between adjacent plows or shovels.

Seeds are customarily deposited in the seed trenches or rows in the ground formed by the shovels or plows and thereafter they are tamped in place by a separate wheel which is provided for each plow or shovel so that all of the seeds deposited in the row generated by that plow or shovel are properly tamped in place. A difficulty commonly encountered in seeding in this manner is that loam turned up by the trailing line of shovels tends to fall into the seed trenches generated on either side thereof by the leading shovels. The practical effect is that seed, deposited thereafter in the seed trench in which loam has been deposited, will not be planted at the desired depth. This will reduce the yield from the seed and also adversely effect the utilization of the land in which the seed is being deposited.

The above noted problems may be reduced by planting at a slower rate. This is not a satisfactory solution since maximum productivity is desirable.

It is an object of the invention to provide apparatus which will consistently plant seeds in a substantially uniform manner so that the yield from a given quantity of seed is maximized and also the utilization of the land in which the seed is planted is also maximized.

It is another object of the invention to provide apparatus which will permit faster seeding operations than are possible with conventional apparatus.

It is another object of the invention to provide apparatus which may be easily installed on existing planting apparatus.

Yet another object of the invention is to provide apparatus which is simple to use.

Still another object of the invention is to provide apparatus which is simple and inexpensive to manufacture.

SUMMARY OF THE INVENTION

The foregoing objects and other objects and advantages which shall become apparent from the detailed description of the preferred embodiment are attained in an apparatus which includes apparatus for seeding having a first plurality of shovels disposed in a first rank at uniform intervals and a second plurality of shovels disposed in a second rank at uniform intervals. The first and second ranks are disposed in generally parallel relationship with the tracks of the shovels in the second rank disposed intermediate the tracks of the shovels in the first rank. A plurality of press wheels are mounted for rotation. Each of the press wheels is disposed in aligned relationship with the track of one of the shovels. A chain or other flexible member is fixed to each of the plurality of first shovels in the first rank. A cylinder is fixed to each of the chains at the end thereof remote from the first rank. Each cylinder extends close to an associated press wheel, disposed in aligned relationship with the shovel disposed in the first rank, on which the associated chain is mounted.

The cylinder may extend to within one inch of the associated press wheel. The spacing between adjacent shovels in the first rank may be the same as the spacing between adjacent shovels in the second rank. The tracks of at least some of the shovels in the first rank may be disposed at equal distances from the tracks of two of the second rank of shovels. The cylindrical member may have a conical axial extremity and the conical axial extremity may be joined to the chain. The cylinder may be approximately three inches in diameter and have a length of approximately fourteen inches.

BRIEF DESCRIPTION OF THE DRAWING

The invention will be better understood by reference to the accompanying drawing in which.

DESCRIPTION OF THE PREFERRED EMBODIMENT

Figure 1:
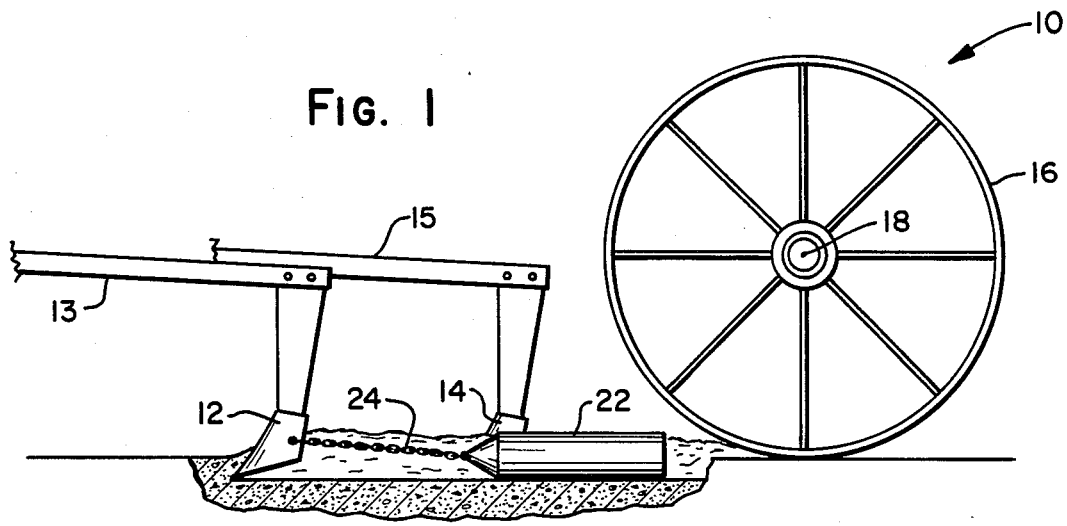
FIG. 1 is a partially schematic elevational view of the apparatus in accordance with the invention.
Figure 2:
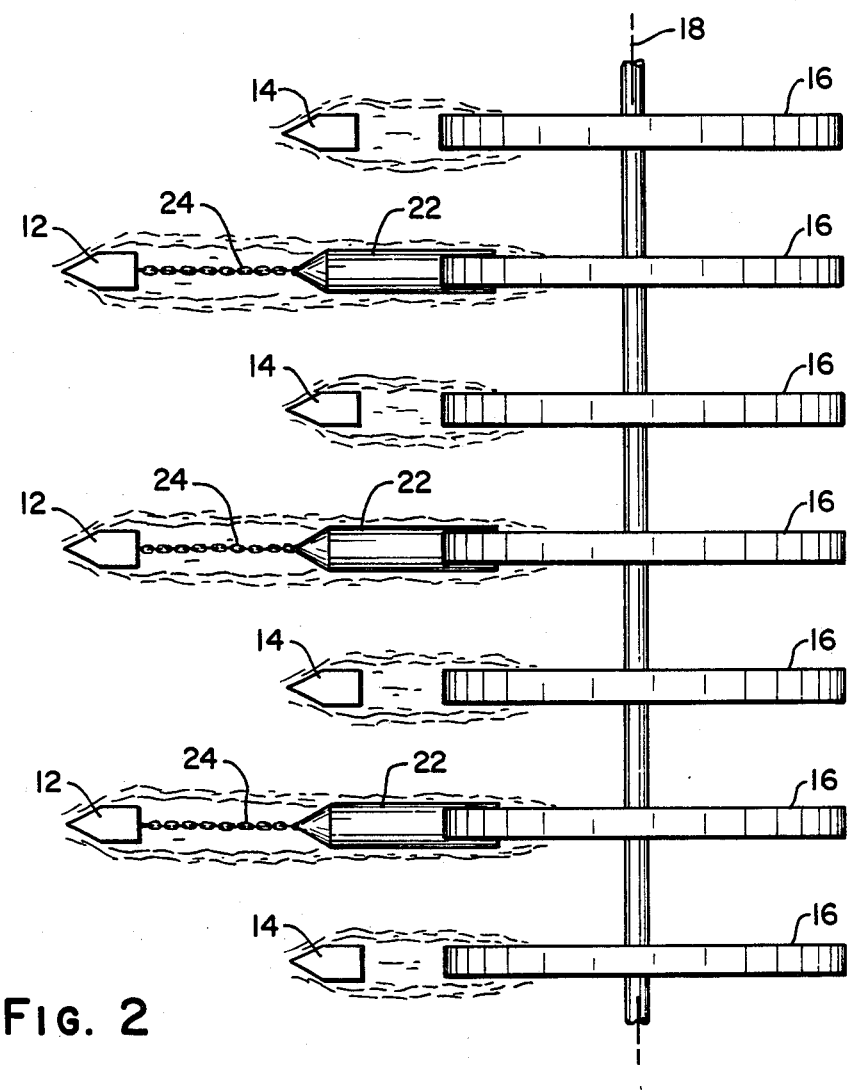
FIG. 2 is a partially schematic top view of the apparatus illustrated in FIG. 1.

Referring now to FIGS. 1 and 2 there is shown a seeding apparatus 10 in accordance with the invention. The apparatus includes a plurality of shovels 12, 12, 12, which are arrayed with a uniform spacing along a first line (not shown) or rank. A plurality of shovels 14, 14, 14 are arrayed along a second line (not shown) or rank. The second rank is disposed in aligned relationship to the first rank and extends behind the first rank. The axial spacing of the individual shovels 14 is uniform between adjacent shovels 14 and the spacing therebetween is the same as the spacing between the adjacent shovels 12. The tracks of shovels 14 are disposed so that the track of at least some of the shovels 14 extends exactly intermediate adjacent tracks of adjacent shovels 12 in the first rank.

A plurality of press wheels 16 are mounted for rotation about a common axis 18. The function of the press wheels 16 is to tamp or press seed in place in the sod. It will be understood that, for simplicity, the entire apparatus typically used (including a Lister Drill or other seeding apparatus) has been omitted. Such apparatus typically includes a separate flexible tube (not shown) which extends down to the lower extremity of each of the shovels 12, 14. The shovels 12, 14 are respectively mounted on supports 13, 15 which are respectively mounted on a common chassis (not shown). Also not shown, is a hopper which is typically used to feed by gravity seed to the tube via a funnel shaped member.

The apparatus in accordance with the invention includes a cylindrical body 22. One cylindrical body 22 is secured to each shovel 12 in the first rank via a separate chain 24. Normally, the cylindrical body 22 and the chain 24 will be dimensioned so as to position the body no more than one inch away from the press wheel 16 with which it is aligned.

In operation the cylindrical body 22 prevents the deposition of soil, which is displaced by shovels 14 in the second rank, from falling into the seed track created by the shovels 12 in the first rank. With conventional apparatus which does not include the chain 24 and the cylindrical body 22, the maximum planting rate which is practical is about 2½ to 3 miles per hour. In contrast, it is possible to use the apparatus in accordance with the invention for seeding grain at rates up to 4 to 5 miles per hour and still provide uniform deposition of seed. The apparatus has been found to function satisfactorily in both wet and dry soil conditions with excellent results. The apparatus may, for example, be used on such apparatus as a mulch hoe drill with 10 inch row spacing and two ranks of shovels which are disposed 20 inches apart. The cylindrical members 22, in the preferred embodiment, are about 3 inches in diameter and 14 inches long.

For application where the apparatus in accordance with the invention is used with a drill having two rows with twenty four inch spacing between the rows for deposition of seeds in a twelve inch row pattern a cylindrical member of three and one half inches in diameter is suitable.

The cylindrical member 22 may be attached to the chain 24 by a 1⅛ inch by 1 inch iron member bent to fit the tapered end of the cylindrical member 22. The cylindrical member 22 normally will have the forward extremity thereof tapered. Th chain 24 is attached to the cylindrical member 22 by means of a ⅛ by 1 inch iron member bent to engage the tapered end of the cylindrical member 22. The iron member is secured by two ¼ inch bolts. The chain is secured to the front shovel 12 by means of a bolt 26 about 3 inches above the bottom of the shovel 12.

Although the FIG. 2 illustrates only three shovels 14 and three shovels 12, it will be understood that typical apparatus will have many more such shovels and that the drawing has been simplified to improve the legibility thereof. Similarly, it will be understood that other geometric forms may be substituted for the cylindrical member 22 without departing from the spirit of the invention. For example, square, rectangular, oval or other cross-sections may be utilized.

The more rapid seeding operations possible with the apparatus in accordance with the invention is of particular importance because time is critical. Maximum farm production is dependent on seeding at an optimum time. Weather may limit the possibilities for actual planting and may make time even more critical. The apparatus in accordance with the invention permits planting in approximately one half the time it would take to do the same job without the apparatus. Stated another way, the same acreage may be planted with about one half the capital investment in drills. Since the capital investment is very substantial the advantage is very significant.

Having thus described my invention I claim:

1. Apparatus for seeding, which comprises:
a plurality of means for opening a furrow disposed in a rank at uniform intervals;
a plurality of press wheels mounted for rotation, each of said press wheels being disposed in aligned relationship with one of said means for opening a furrow;
a plurality of cylindrical members; and
means for attaching each of said plurality of cylindrical members to one of said means for opening a furrow, said means for attaching consisting solely of a chain fixed to each of said means for opening a furrow and fixed to respective ones of said plurality of cylindrical members, each cylindrical member being free to extend toward an associated press wheel disposed in aligned relationship with said means for opening a furrow disposed in said rank from which said chain is mounted, each chain member extending generally rectilinearly during normal operation, each of said chains being dimensioned to allow the cylindrical member fixed thereto to extend so that an extremity of the member is within one inch of said associated press wheel.

2. The apparatus as described in claim 1, wherein:
each of said cylindrical members has a conical axial extremity and said conical axial extremity is joined to said chain.

3. The apparatus as described in claim 2, wherein:
said cylindrical member is approximately three inches in diameter.

4. The apparatus as described in claim 3, wherein:
said cylindrical member has a length of approximately fourteen inches.

5. Apparatus for seeding, which comprises:
a first plurality of shovels disposed in a first rank at uniform intervals;
a second plurality of shovels disposed in a second rank at uniform intervals;
said first and second ranks being disposed in generally parallel relationship with the track of said shovels in said second rank being intermediate the tracks of said shovels in said first rank;
a plurality of press wheels mounted for rotation, each of said press wheels being disposed in aligned relationship with the track of one of said shovels;
a plurality of cylindrical members; and
means for attaching each of said plurality of cylindrical members in said first rank, said means for attaching consisting solely of a chain fixed to each of said plurality of first shovels in said first rank and fixed to respective ones of said plurality of cylindrical members, each cylindrical member being free to extend toward an associated press wheel disposed in aligned relationship with said shovel disposed in said first rank from which said chain is mounted, each chain extending generally rectilinearly and generally horizontally during normal operation, each of said chains being dimensioned to allow the cylindrical member fixed thereto to extend so that an extremity of the member is within one inch of said associated press wheel.

6. The apparatus as described in claim 5, wherein:
the spacing between adjacent shovels in said first rank is the same as the spacing between adjacent shovels in said second rank.

7. The apparatus as described in claim 6, wherein:
the track of at least some of said shovels in said first rank is disposed at equal distances from the tracks of two of said second rank shovels.

8. The apparatus as described in claim 7, wherein:

the end of each of said cylindrical members extends to said second rank.

9. The apparatus as described in claim 8, wherein: each of said cylindrical members has a conical axial extremity and said conical axial extremity is joined to said chain.

10. The apparatus as described in claim 9, wherein: said cylindrical member is approximately three inches in diameter.

11. The apparatus as described in claim 10, wherein: said cylindrical member has a length of approximately fourteen inches.

* * * * *